US009386534B2

United States Patent
Yu et al.

(10) Patent No.: US 9,386,534 B2
(45) Date of Patent: Jul. 5, 2016

(54) MODE SELECTION AND TRANSMIT POWER MANAGEMENT FOR MULTIMODE SMALL CELLS

(71) Applicant: QUALCOMM Incorporated, San Diego, CA (US)

(72) Inventors: Liwen Yu, San Diego, CA (US); Sumeeth Nagaraja, San Diego, CA (US); Farhad Meshkati, San Diego, CA (US); Rajat Prakash, San Diego, CA (US); Tao Chen, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 14/485,511

(22) Filed: Sep. 12, 2014

(65) Prior Publication Data

US 2015/0119063 A1 Apr. 30, 2015

Related U.S. Application Data (60) Provisional application No. 61/897,132, filed on Oct. 29, 2013.

(51) Int. Cl.
| | |
|---|---|
| *H04W 52/18* | (2009.01) |
| *H04W 24/02* | (2009.01) |
| *H04W 52/38* | (2009.01) |
| *H04W 16/14* | (2009.01) |
| *H04W 52/24* | (2009.01) |
| *H04W 88/10* | (2009.01) |

(52) U.S. Cl.
CPC ............. *H04W 52/18* (2013.01); *H04W 16/14* (2013.01); *H04W 24/02* (2013.01); *H04W 52/38* (2013.01); *H04W 52/244* (2013.01); *H04W 88/10* (2013.01)

(58) Field of Classification Search
CPC .............................. H04W 52/18; H04W 24/02
See application file for complete search history.

(56) References Cited

U.S. PATENT DOCUMENTS

| | | | |
|---|---|---|---|
| 2008/0244148 A1 | 10/2008 | Nix, Jr. et al. | |
| 2010/0329210 A1 | 12/2010 | Shirota et al. | |
| 2012/0052793 A1* | 3/2012 | Brisebois et al. | 455/1 |
| 2012/0147764 A1* | 6/2012 | Wang et al. | 370/252 |
| 2012/0250548 A1 | 10/2012 | Swaminathan et al. | |
| 2013/0040688 A1 | 2/2013 | Mizusawa | |
| 2013/0189999 A1 | 7/2013 | Nakata | |
| 2013/0194989 A1* | 8/2013 | Centonza et al. | 370/311 |
| 2013/0310077 A1 | 11/2013 | Siomina et al. | |

(Continued)

FOREIGN PATENT DOCUMENTS

| | | |
|---|---|---|
| WO | 2012134567 A1 | 10/2012 |
| WO | 2013100827 A1 | 7/2013 |
| WO | 2014137569 A1 | 9/2014 |

OTHER PUBLICATIONS

International Search Report and Written Opinion—PCT/US2014/055707—ISA/EPO—Nov. 24, 2014.

*Primary Examiner* — Leon Flores
(74) *Attorney, Agent, or Firm* — Arent Fox LLP (57) ABSTRACT

Described herein are techniques for mode selection and power management for multimode small cells. For example, the technique may involve taking measurements, at the access point, of a macro cell in a vicinity of the access point. The technique may involve managing power or resources of a first RAT and a second RAT based on the measurements, wherein the power of at least one of the first RAT or second RAT is associated with coverage area of the macro cell.

28 Claims, 6 Drawing Sheets

(56) References Cited

U.S. PATENT DOCUMENTS

| | | |
|---|---|---|
| 2013/0322235 A1 | 12/2013 | Khoryaev et al. |
| 2014/0086173 A1 | 3/2014 | Sadeghi et al. |
| 2014/0094149 A1 | 4/2014 | Claussen et al. |
| 2014/0098761 A1 | 4/2014 | Lee et al. |
| 2014/0128078 A1 | 5/2014 | Zhu et al. |
| 2014/0335883 A1* | 11/2014 | Ericson et al. ............. 455/452.2 |
| 2015/0117360 A1 | 4/2015 | Shen et al. |

\* cited by examiner

MODE SELECTION AND TRANSMIT POWER MANAGEMENT FOR MULTIMODE SMALL CELLS

CROSS-REFERENCE TO RELATED APPLICATION

The present Application for Patent claims priority to Provisional Application No. 61/897,132, filed Oct. 29, 2013, entitled "MODE SELECTION AND TRANSMIT POWER MANAGEMENT FOR MULTIMODE SMALL CELLS" and which is assigned to the assignee hereof, and is hereby expressly incorporated in its entirety by reference herein.

BACKGROUND

Aspects of the present disclosure relate generally to wireless communication systems, and more particularly to mode selection and power management for a multimode small cell.

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks. As used herein, a "carrier" refers to a radio band centered on a defined frequency and used for wireless communications.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A wireless communication network may support operation on multiple carriers. A carrier may refer to a range of frequencies used for communication and may be associated with certain characteristics. For example, a carrier may be associated with system information describing operation on the carrier. A carrier may also be referred to as a component carrier (CC), a frequency channel, a cell, etc.

A small cell may have more than one radio access technology (RAT) such as 3G, LTE, WLAN, etc. However, optimizing operation of the different RATs may be challenging. In this context, there remains a need for mechanisms for operation of the RATs at a small cell.

SUMMARY

Methods and apparatus for mode selection and power management of a wireless entity are described in detail in the detailed description, and certain aspects are summarized below. This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

In an aspect, a method is provided for managing an access point configured for communication in a plurality of radio access technologies (RATs) in a wireless communication system. The method includes taking measurements, at the access point, of a macro cell in a vicinity of the access point. The method includes managing power or resources of a first RAT and a second RAT based on the measurements, wherein the power of at least one of the first RAT or second RAT is associated with coverage area of the macro cell.

In another aspect, an apparatus is provided for communication in a plurality of radio access technologies (RATs) in a wireless communication system. The apparatus includes means for taking measurements of a macro cell in a vicinity of the access point. The apparatus includes means for managing power or resources of a first RAT and a second RAT based on the measurements, wherein the power of at least one of the first RAT or second RAT is associated with coverage area of the macro cell.

In another aspect, an apparatus is provided for communication in a plurality of radio access technologies (RATs) in a wireless communication system. The apparatus includes at least one transceiver configured for taking measurements of a macro cell in a vicinity of the access point. The apparatus includes at least one processor configured for managing power or resources of a first RAT and a second RAT based on the measurements, wherein the power of at least one of the first RAT or second RAT is associated with coverage area of the macro cell. The apparatus includes a memory coupled to the at least one processor for storing data.

In another aspect, a non-transitory computer-readable medium storing executable instructions causes a data processing device to take measurements of a macro cell in a vicinity of the access point. The computer-readable medium further causes the data processing device to manage power or resources of a first RAT and a second RAT based on the measurements, wherein the power of at least one of the first RAT or second RAT is associated with coverage area of the macro cell.

It is understood that other aspects will become readily apparent to those skilled in the art from the following detailed description, wherein it is shown and described various aspects by way of illustration. The drawings and detailed description are to be regarded as illustrative in nature and not as restrictive.

DETAILED DESCRIPTION

The present disclosure relates to techniques for mode selection and power management of a small cell. For example, the small cell may be configured for at least two radio access technologies (RATs), and the small cell may select a mode for each RAT based on measurements. The small cell may configure a transmit power of each RAT. The RATs may be any one of 3G, LTE, WLAN, etc.

In one example, there is provided a network entity (e.g., the small cell base station) configured with at least two RATs. The small cell may take measurements of a macro cell at a network listen module (NLM). Based on the NLM measurements, the small cell may configured a mode and transmit power of the RATs.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
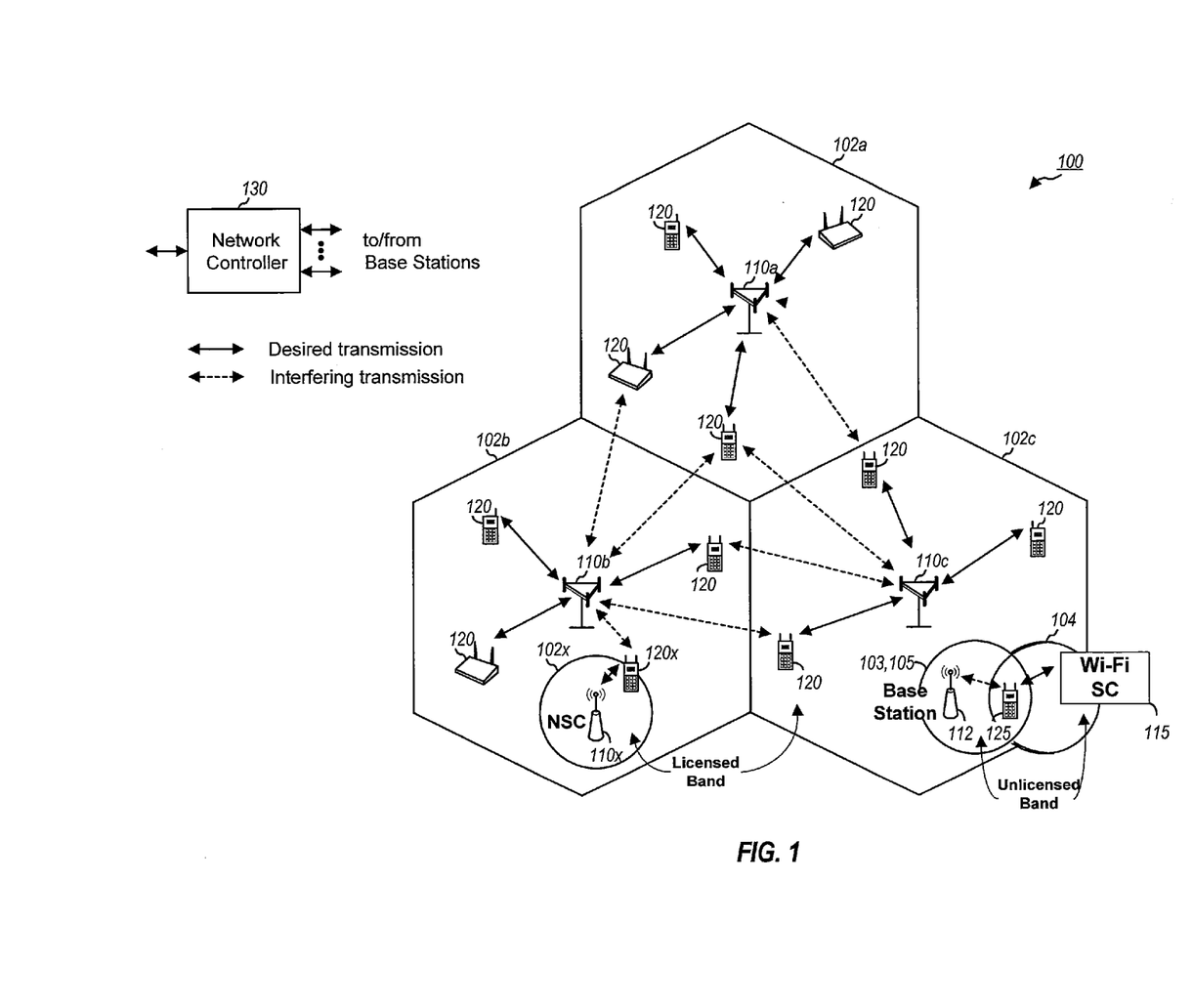
FIG. 1 is a block diagram conceptually illustrating an example of a telecommunications system.

FIG. 1 shows an example wireless communication network 100, which may be an LTE network or the like. The wireless network 100 may include a number of base stations 110 (e.g., evolved Node Bs (eNBs), NSCs, etc.) and other network entities. A base station may be a station that communicates with the UEs and may also be referred to as a Node B, an AP, or other term. Each eNB 110a, 110b, 110c may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell or a small cell (e.g., a pico cell, a femto cell, etc.), and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A small cell may cover a relatively small geographic area (e.g., a home) and may allow restricted access by UEs having association with the small cell (e.g., UEs in a closed subscriber group (CSG), UEs for users in the home, etc.). It is noted that a small cell (e.g., pico cell, a femto cell, etc.) are examples of NSCs.

An eNB for a macro cell may be referred to as a macro eNB. An eNB for a pico cell may be referred to as a pico eNB. An eNB for a NSC may be referred to as a NSC eNB or a home eNB (HNB). In the example shown in FIG. 1, the eNBs 110a, 110b and 110c may be macro eNBs for the macro cells 102a, 102b and 102c, respectively.

An eNB may be configured with at least two RATs. For example, the eNB may include modules for LTE, 1×, and WLAN. In the case of a WLAN-enabled eNB, the eNB may operate in the unlicensed spectrum. The eNB 110x may be a NSC eNB for a NSC 102x, serving a UE 120x. In the present example, eNB 110x operates in licensed bands, as do the eNBs 110a, 110b and 110c. In contrast, a base station 112 operates in an unlicensed band, and includes both a NSC eNB module for a NSC 103 and a WLAN AP module to provide Wi-Fi coverage in a service area 105. The multiple-RAT base station 112 may serve a UE 125 that is configured to operate in the unlicensed band, either via the NSC 103 or via Wi-Fi, assuming the UE 125 is within the coverage area 105 and configured for Wi-Fi (i.e., includes a Wi-Fi radio module).

Figure 2:
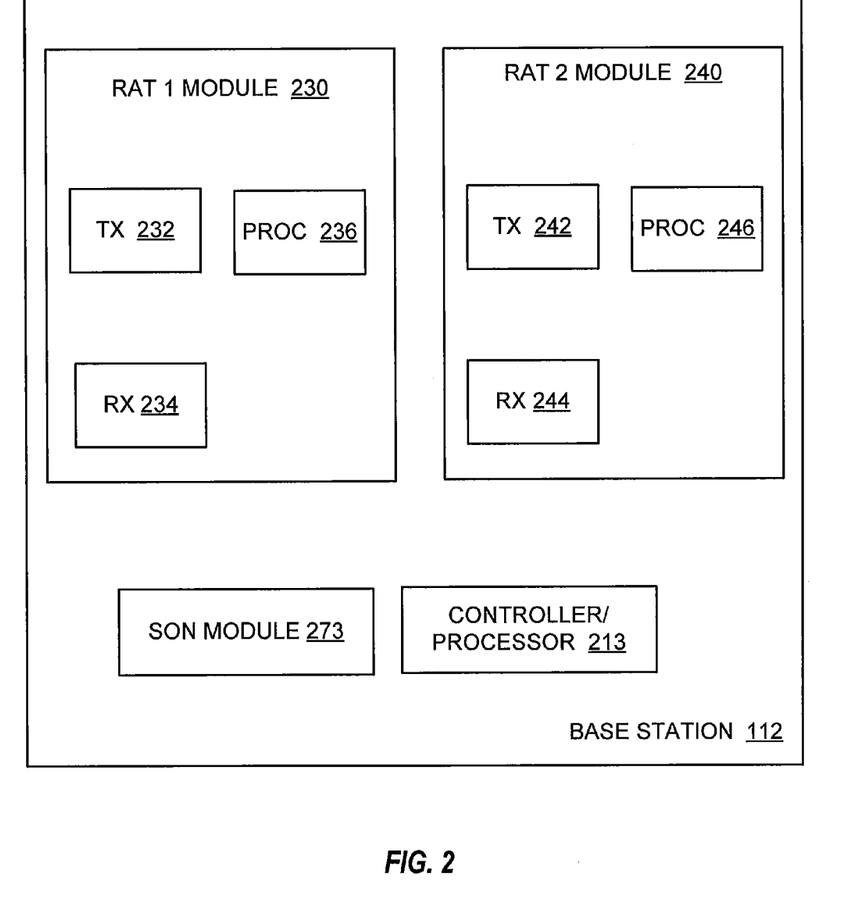
FIG. 2 shows a base station with multiple radio access technologies (RATs).

An example multiple-RAT base station 112 is shown in FIG. 2. For example, a first RAT module 230 (e.g., LTE module) and a second RAT module 240 (e.g., 1× module) may be co-located.

The base station 112 may optionally include a controller/processor module 213 and/or self-organizing network (SON) module 273 in operative communication with the NSC RAT 1 module 230 and the RAT 2 module 240 to coordinate the activity of the modules 230, 240 and/or components thereof. The SON module 273 may perform operations related to SON features of the base station 112. For example, the SON module 273 may enable distributed optimization of the base stations.

In related aspects, the RAT 1 module 230 may include a transmitter (TX) component 232, a receiver (RX) component 234, a processor component 236, wherein each of the components are in operative communication with each other.

The RAT 1 module 230 may include one or more of the components of base station 112 shown on the left hand side of FIG. 2. The RAT 2 module 240 may include a TX component 242, a RX component 244, and a processor component 246, wherein each of the components are in operative communication with each other. In further related aspects, one or more of the components 232-236 may be configured to manage the power of the RAT 1 module. Additionally or alternatively, the controller/processor 213 or controller/processor 213 coupled to components 232-236 may be configured to manage the power of the RAT 1 module.

In further related aspects, one or more of the components 242-246 may be configured to manage the power of the RAT 2 module. Additionally or alternatively, the controller/processor 213 or controller/processor 213 coupled to components 242-246 may be configured to manage the power of the RAT 2 module.

With reference once again to FIG. 1, a network controller 130 may couple to a set of eNBs and provide coordination and control for these eNBs. The network controller 130 may communicate with the eNBs 110 via a backhaul. The eNBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, or other mobile devices. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

Figure 3:
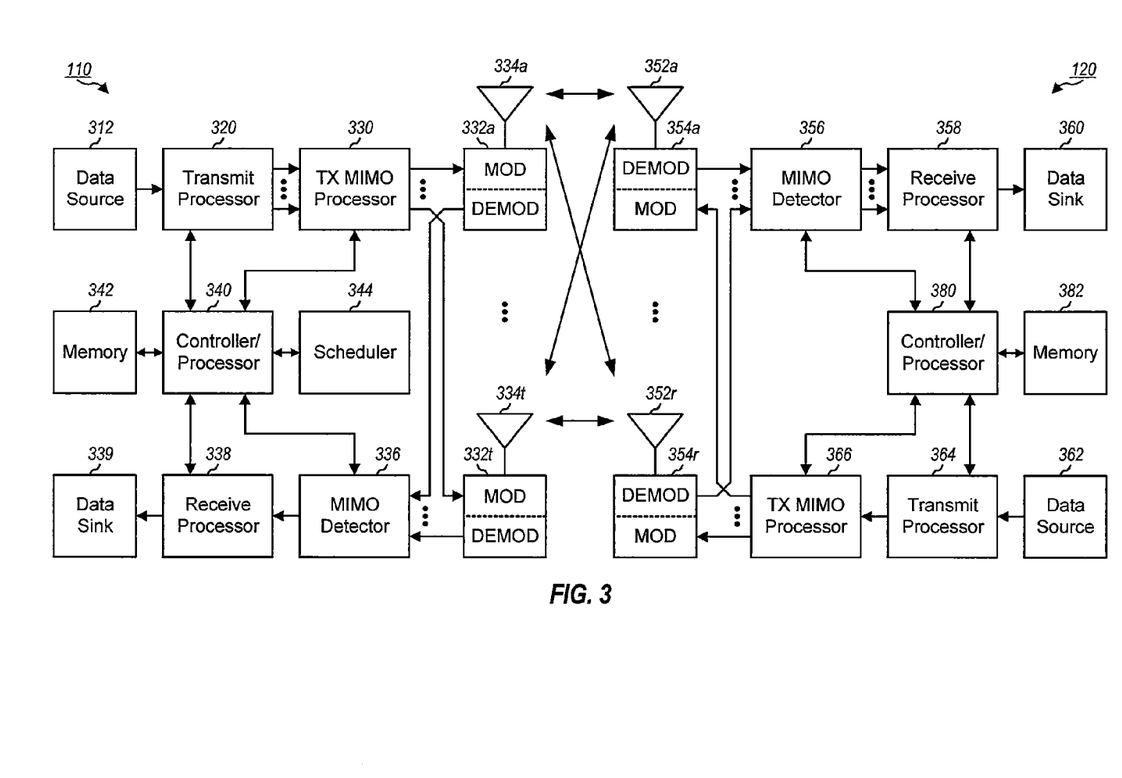
FIG. 3 is a block diagram illustrating a design of a base station/eNB and a UE configured according to one aspect of the present disclosure.

FIG. 3 shows a block diagram of a design of a base station 110 and a UE 120, which may be one of the base stations (e.g., an NSC such as 110x, 110y, or 110z) and one of the UEs, respectively, in FIG. 1. The base station 110 may be equipped with antennas 334a through 334t, and the UE 120 may be equipped with antennas 352a through 352r.

At the base station 110, a transmit processor 320 may receive data from a data source 312 and control information from a controller/processor 340. The control information may be for the PBCH, PCFICH, PHICH, PDCCH, etc. The data may be for the PDSCH, etc. The processor 320 may process (e.g., encode and symbol map) the data and control information to obtain data symbols and control symbols, respectively. The processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. Downlink signals from modulators 332a through 332t may be transmitted via the antennas 334a through 334t, respectively.

At the UE 120, the antennas 352a through 352r may receive the downlink signals from the base station 110 and may provide received signals to the demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all the demodulators 354a through 354r, perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The processor 364 may also generate reference symbols for a reference signal. The symbols from the transmit processor 364 may be precoded by a TX MIMO processor 366 if applicable, further processed by the modulators 354a through 354r (e.g., for SC-FDM, etc.), and transmitted to the base station 110. At the base station 110, the uplink signals from the UE 120 may be received by the antennas 334, processed by the demodulators 332, detected by a MIMO detector 336 if applicable, and further processed by a receive processor 338 to obtain decoded data and control information sent by the UE 120. The processor 338 may provide the decoded data to a data sink 339 and the decoded control information to the controller/processor 340.

The controllers/processors 340 and 380 may direct the operation at the base station 110 and the UE 120, respectively. The processor 340 and/or other processors and modules at the base station 110 may perform or direct the execution of the functional blocks illustrated in FIG. 5, and/or other processes for the techniques described herein. The memories 342 and 382 may store data and program codes for the base station 110 and the UE 120, respectively. A scheduler 344 may schedule UEs for data transmission on the downlink and/or uplink.

As will be readily appreciated, antennas 334, modulators 332, transmit processor 320, and/or TX MIMO processor 330 may form a transmit chain of eNB 120 and supply means for sending or transmitting downlink signals under the control of processor 340.

As will be readily appreciated, antennas 334, demodulators 354, receive processor 338, and/or RX MIMO detector 336 may form a receive chain of eNB 120 and supply means for taking measurements (e.g., of a nearby macro cell). The eNB 120 may include a network listen module (not shown) for taking the measurements.

In one aspect, processor 340 may include modules for performing operations of the methods described herein, by executing instructions held in the memory 342. The processor 340 may include means for taking measurements of the macro cells, and means for mode selection and power management of the RATs.

In accordance with one or more aspects of the disclosure, there are provided methods and apparatuses for operation of a small cell configured with multiple RATs.

This disclosure provides algorithms for mode selection and transmit power management at small cells that may have more than one RAT (e.g., 3G, LTE, WLAN, etc.) The mode selection algorithm may determine if a particular RAT at the small cell needs to be turned on or off based on the neighborhood information (e.g., measurements from neighbor cells). The downlink transmit power management algorithm may provide similar coverage footprints across different technologies. The algorithms may rely on inputs from the NLM, UE reports, OAM, information received over X2, etc. The algorithm may improve or maximize network available and utility. The implementation of the algorithm may be distributed or centralized. For example, in a distributed scenario, each small cell may collect the data and configure the mode and power of the RATs. In another example, in a centralized scenario, a centralized entity (e.g., one of the small cells, a network node, etc.), may collect the data (e.g., from the small cells) and direct the small cells to configured the mode and power of the RATs.

In a network where an operator may have multiple frequencies (e.g., f1, f2, and f3) for deploying macro cells and small cells (e.g., femto, pico, micro, etc.), it may be possible to deploy small cells with multiple RATs. For example, 3G may operate on f1 and f2, while LTE operates on f3. Furthermore, co-channel or dedicated channel deployment scenarios for 3G deployment may be possible. For example, small cells may be deployed in one frequency (e.g., f1) and macro cells may be deployed either f1, f2 or only in f2. The small cells may operate in any of the modes including open, closed, or hybrid mode.

The objectives for the techniques may include determining if a technology at the small cell needs to be turned on or off, and managing the transmit power of the small cell to match coverage offered by technologies. For example, it may be a feature to match LTE coverage to 3G coverage at the small cell to enable circuit switched fallback from LTE to 3G. In another example, transmit powers across RATs may be matched to maintain similar user experiences across different technologies.

The algorithm may use information from the NLM, UE reports, information received over X2, from OAM, etc. to determine an appropriate mode of operation and downlink transmit power levels. For example, a small cell may determine a correct mode of operation, e.g., for 3G and transmit power level for, e.g., LTE.

The algorithm may run at the small cell in a distributed implementation or at a central server in a centralized implementation. The methods may be applied to different technologies.

Figure 4:
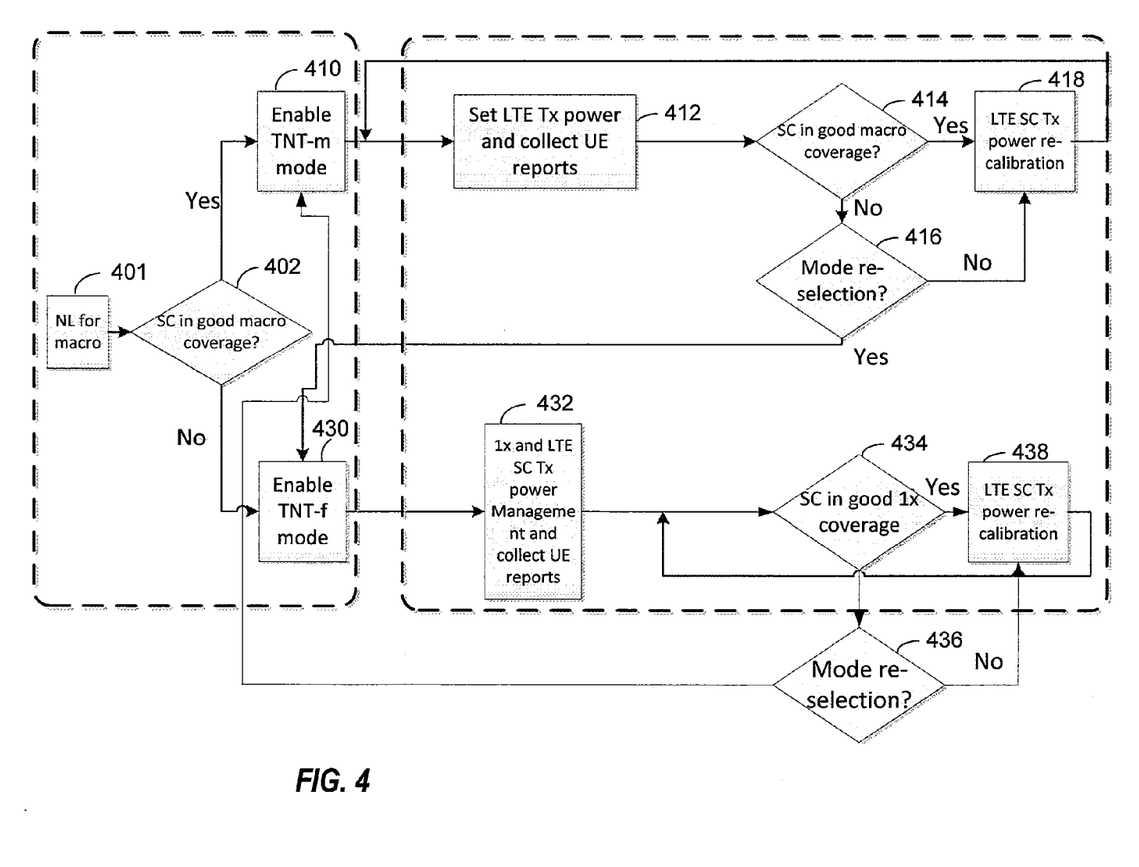
FIG. 4 is an example flow diagram for operation of a small cell configured for multiple RATs.

FIG. 4 is an example flow diagram for operation of a small cell configured for multiple RATs.

At power up, a node (e.g., a small cell) may take NL measurements (or rely on configuration by an OEM) and select a transmission mode of the RATs at the node. For example, the node may be configured with two or more RATs (e.g., LTE, 3G, WLAN, etc.). If a macrocell (e.g., a 3G macrocell) in vicinity is strong, the small cell may make use of the strong macrocell ("home to a macro cell"). Otherwise, the small cell may provide 3G coverage to complement the weak macro cell ("home to a femto cell").

If a small cell homes to the macro cell, it may shut down 3G transmission or lower its power and may set a large coverage area for other technologies (LTE, WLAN, etc.). UE reports may be collected through intra- and inter-RAT measurements. If UE reports indicate that areas in good LTE coverage are also well-covered by macro cells, the node may react by powering up the LTE transmit power. If the UE reports indicate macro cell coverage holes, the node may have two options. In one option the node may either re-select to home to the small cell, or, the node may power down the LTE transmit power so as to constrain the LTE coverage to be within the macro cell coverage. The option that provides better LTE coverage may be selected.

If a node homes to the small cell, the initial transmit power may be determined by NL-based power calibration. The key criterion may be to match the LTE coverage with the 1× small cell coverage. Coverage matching is based on criterion such as, for example, signal-to-noise ratio (SNR), reference signal received power (RSRP), energy to interference (Ec/Io), throughput, etc. Based on the collected UE reports, the small cell may fine-tune the LTE transmit power. If there are 1× coverage holes, the LTE transmit power may be lowered. Otherwise, the LTE transmit power may be increased.

The algorithm may run at each small cell in a distributed manner. In such case, the small cells perform the methods without instructions from a central node or other neighbor nodes.

In another other implementation, the algorithm may reside at a central server that collects NLM measurements, UE reports from small cells, and may takes action to optimize a utility function. The centralized algorithm may determine the mode and transmit power and communicate them to each small cell.

Furthermore, coverage matching may also be achieved by throttling user rate on the RATs. For instance reducing the amount of resources (time, frequency) to users on LTE may be done when the UEs move beyond 3G coverage.

The method illustrated in FIG. 4 may apply to measurements from the NLM and/or UE reports. The disclosure, however, is not limited to such measurements and reports. Another module or another device (e.g., a neighbor node) may provide data for mode selection and power control.

At step 401, the method may collect data from a NL module. For example, the data may be collected from a nearby macro cell. At step 2, the method may determine whether a small cell is in good macro cell coverage based on a threshold (e.g., a predetermined threshold, user defined threshold, network operator input, etc.).

In a first branch corresponding to a determination of good macro cell coverage based on the threshold, at step 402, the method may enable a first mode (e.g., TNT-m mode). The method may proceed to step 410 and set a first RAT (e.g., LTE) transmission power. For example the method may set LTE power to a maximum power. The method may disable 1× or set 1× to a minimum power when the small cell is in a good macro cell coverage area. When there is good macro cell coverage, 1× coverage may not need to be provided by the small cell. At step 412, the method may receive measurement reports from one or more UEs. At step 414, the method may determine whether the small cell is in a good macro cell coverage based on the received measurements from the UEs. The coverage of the macro cell may be different than indicated from the NL module because the coverage as experienced at the UEs may be different than that of the small cell. If the method determines that the coverage is not good, the method may proceed to step 416. At step 416, the method may determine whether to re-select to another mode. In some cases, the mode re-selection may be based on any combination of the measurement reports and/or NL measurements. In some cases, the decision may be based on other metrics or predetermined conditions. If it is determined to re-select the mode, then the method may proceed to step 430. Otherwise, if mode reselection is not necessary, the method proceeds to step 418, where the LTE transmission power may be calibrated. For example, the LTE power may be calibrated based on any combination of the NL measurements and/or reports from the UEs. Following step 418, the method returns to step 412.

Return to step 402, if the method determines that the small cell is not in a good coverage area, then the method may proceed to step 430 to select a mode (e.g., TNT-f mode). In one example, if coverage is not good, the small cell may complement the macro cell coverage by providing 1× coverage. In this case, the small cell may set the 1× coverage to a maximum. At step 432, the method may set the 1× and LTE transmit power to a maximum. The method may collect UE reports at 432. The method proceeds to step 434 to determine whether the small cell is in a good macro cell coverage based on the received measurements from the UEs. The coverage of the macro cell may be different than indicated from the NL module because the coverage as experienced at the UEs may be different than that of the small cell. If the method determines that the coverage is not good, the method may proceed to step 436. At step 436, the method may determine whether to re-select to another mode. In some cases, the mode re-selection may be based on any combination of the measurement reports and/or NL measurements. In some cases, the decision may be based on other metrics or predetermined conditions. If it is determined to re-select the mode, then the method may proceed to step 410. Otherwise, if mode reselection is not necessary, the method proceeds to step 438, where the LTE transmission power may be calibrated. For example, the LTE power may be calibrated based on any combination of the NL measurements and/or reports from the UEs. Following step 438, the method returns to step 434.

Figure 5:
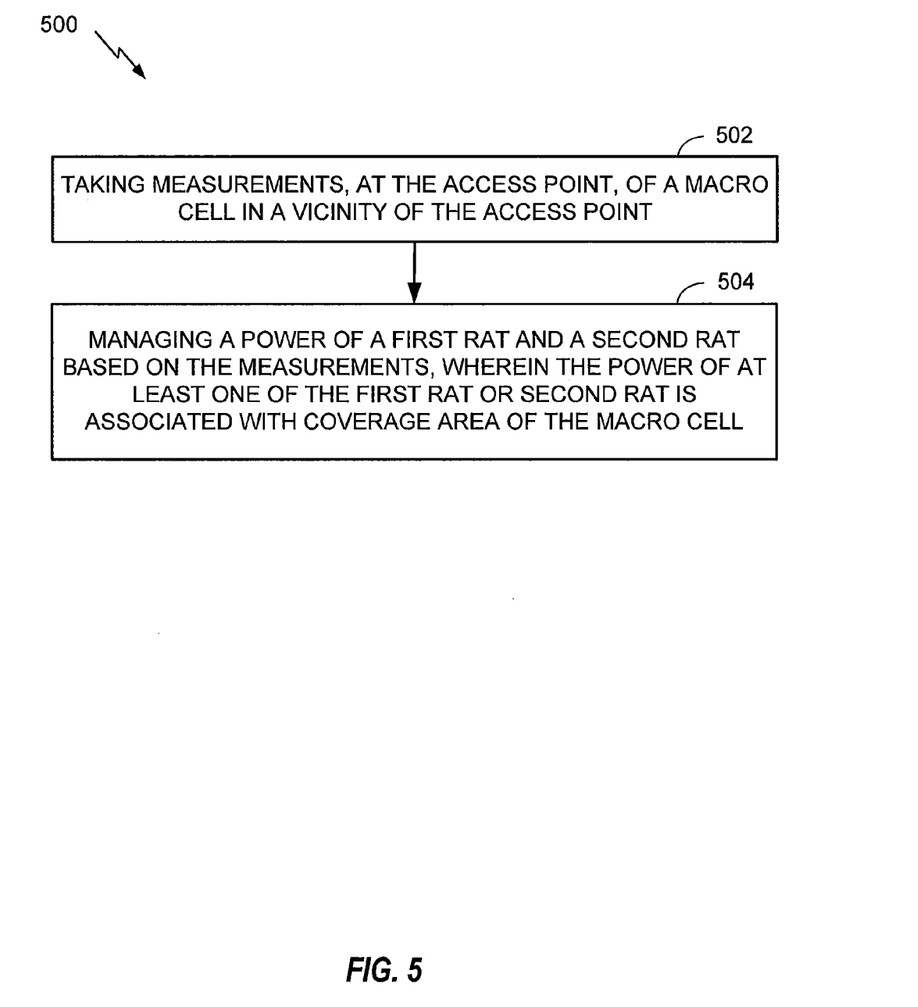
FIG. 5 illustrates aspects of a methodology for mode selection and power management of an access point.

With reference to FIG. 5, there is shown a methodology 500, operable by an access point, access node, eNB, network node, or the like. The access point may be eNB 110 of FIG. 3 or eNB 112 of FIG. 2. The access point may be configured and enabled for operation with multiple RATs. Specifically, method 500 may describe mode selection and power control. The method 500 may include, at 502, taking measurements, at the access point, of a macro cell in a vicinity of the access point. The method 500 may include, at 504, calibrating a power of a first RAT and a second RAT based on the measurements, wherein the power of at least one of the first RAT or second RAT is associated with coverage area of the macro cell.

Figure 6:
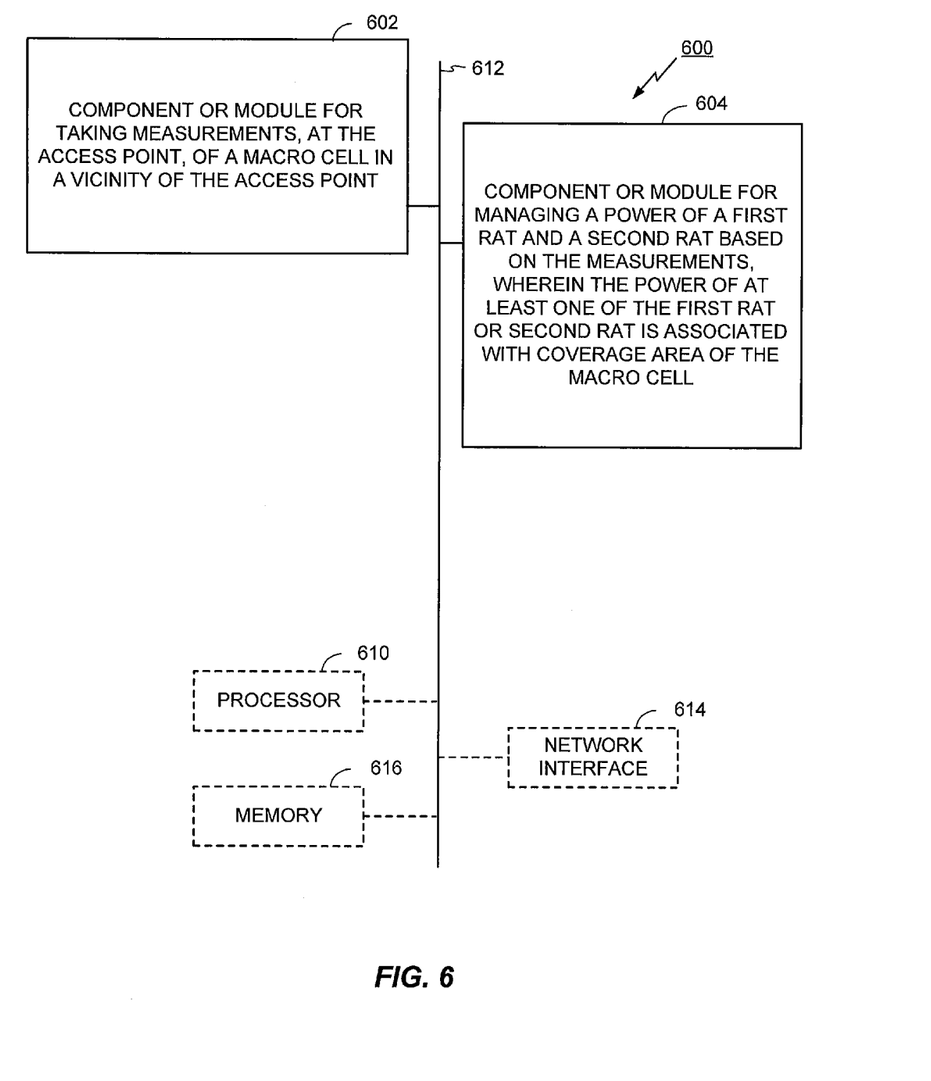
FIG. 6 is an example embodiment for an access point for in accordance with the methodology of FIG. 5.

With reference to FIG. 6, there is provided an exemplary apparatus 600 that may be configured as an access point, access node, eNB, network node, or other suitable entity, or as a processor, component or similar device for use within the eNB, or other suitable entity. The apparatus 600 may include functional blocks that can represent functions implemented by a processor, software, or combination thereof (e.g., firmware).

As illustrated, in one embodiment, the apparatus 600 may include an electrical component or module 602 for taking measurements, at the access point, of a macro cell in a vicinity of the access point. The apparatus 600 may include an electrical component or module 604 for calibrating a power of a first RAT and a second RAT based on the measurements, wherein the power of at least one of the first RAT or second RAT is associated with coverage area of the macro cell.

In related aspects, the apparatus 600 may optionally include a processor component 610 having at least one processor, in the case of the apparatus 600 configured as a network entity. The processor 610, in such case, may be in operative communication with the components 602-604 or similar components via a bus 612 or similar communication coupling. The processor 610 may effect initiation and scheduling of the processes or functions performed by electrical components or modules 602-604.

In further related aspects, the apparatus 600 may include a network interface component 614 for communicating with other network entities. The apparatus 600 may optionally include a component for storing information, such as, for example, a memory device/component 616. The computer readable medium or the memory component 616 may be operatively coupled to the other components of the apparatus 600 via the bus 612 or the like. The memory component 616 may be adapted to store computer readable instructions and data for performing the activity of the components 602-604, and subcomponents thereof, or the processor 610. The memory component 616 may retain instructions for executing functions associated with the components 602-604. While shown as being external to the memory 616, it is to be understood that the components 602-604 can exist within the memory 616.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer-readable storage media and communication media including media that facilitates transfer of a computer program from one place to another. A computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), then the coaxial cable, fiber optic cable, twisted pair, or DSL, are included in the definition of computer-readable medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. A method for managing an access point configured for communication in a plurality of radio access technologies (RATs) in a wireless communication system, the method comprising:
    taking measurements, at the access point, of signals from a base station, wherein the access point provides communication coverage for a small cell and the base station provides communication coverage for a macro cell that overlaps with the small cell;
    determining, by one or more processors of the access point and based on the measurements, a level of communication coverage provided by the base station to the small cell using a first RAT; and
    in response to a determination that the level of communication coverage provided by the base station to the small cell using the first RAT meets or exceeds a threshold level of communication coverage, reducing a transmit power for at least a second RAT of the access point, wherein the second RAT is different than the first RAT and the second RAT provides a lower download speed than the first RAT.

2. The method of claim 1, further comprising:
    selecting a first mode of operation for the first RAT in response to determining that the level of communication coverage provided by the base station to the small cell is below the threshold level of communication coverage; and
    selecting a second mode of operation for the first RAT in response to determining that the level of communication coverage provided by the base station to the small cell meets or exceeds the threshold level of communication coverage.

3. The method of claim 2, further comprising:
    determining whether the level of communication coverage provided by the base station to the small cell meets or exceeds a second threshold level of communication coverage;
    reselecting a first mode of operation for the first RAT in response to determining that the level of communication coverage provided by the base station to the small cell is below the second threshold level of communication coverage; and
    reselecting a second mode of operation for the first RAT in response to determining that the level of communication coverage provided by the base station to the small cell meets or exceeds the second threshold level of communication coverage.

4. The method of claim 1, further comprising:
    receiving additional measurements of the macro cell from at least one user equipment (UE); and
    recalibrating the transmit power of the second RAT based on the additional measurements.

5. The method of claim 1, wherein taking measurements comprises at least one of performing network listen (NL), receiving a UE report, receiving the measurements over X2, or receiving the measurements from Operations, Administration, and Management (OAM).

6. The method of claim 1, further comprising:
    determining the transmit power for the second RAT based on the level of communication coverage provided by the base station to the small cell using the first RAT.

7. The method of claim 1, wherein the second RAT is one of 1x, Universal Mobile Telecommunications System (UMTS), or Global System for Mobile Communications (GSM), and the first RAT is Long Term Evolution (LTE).

8. An apparatus configured for communication in a plurality of radio access technologies (RATs) in a wireless communication system, the apparatus comprising:
    means for taking measurements of signals from a base station, wherein an access point provides communication coverage for a small cell and the base station provides communication coverage for a macro cell that overlaps with the small cell;
    means for determining, based on the measurements, a level of communication coverage provided by the base station to the small cell using a first RAT; and
    means for reducing a transmit power for at least a second RAT of the access point in response to a determination that the level of communication coverage provided by the base station to the small cell using the first RAT meets or exceeds a threshold level of communication coverage, wherein the second RAT is different than the first RAT and the second RAT provides a lower download speed than the first RAT.

9. The apparatus of claim 8, further comprising:
    means for selecting a first mode of operation for the first RAT in response to determining that the level of communication coverage provided by the base station to the small cell is below the threshold level of communication coverage; and
    means for selecting a second mode of operation for the first RAT in response to determining that the level of communication coverage provided by the base station to the small cell meets or exceeds the threshold level of communication coverage.

10. The apparatus of claim 9, further comprising:
    means for determining whether the level of communication coverage provided by the base station to the small cell meets or exceeds a second threshold level of communication coverage;
    means for reselecting a first mode of operation for the first RAT in response to determining that the level of communication coverage provided by the base station to the small cell is below the second threshold level of communication coverage; and
    means for reselecting a second mode of operation for the first RAT in response to determining that the level of communication coverage provided by the base station to the small cell meets or exceeds the second threshold level of communication coverage.

11. The apparatus of claim 8, further comprising:
    means for receiving additional measurements from at least one UE; and
    means for recalibrating the transmit power of the second RAT based on the additional measurements.

12. The apparatus of claim 8, wherein taking measurements comprises at least one of performing network listen (NL), receiving a UE report, receiving the measurements over X2, or receiving the measurements from Operations, Administration, and Management (OAM).

13. The apparatus of claim 8, further comprising:
means for determining the transmit power for the second RAT based on the level of communication coverage provided by the base station to the small cell using the first RAT.

14. The apparatus of claim 8, wherein the second RAT is one of 1x, Universal Mobile Telecommunications System (UMTS), or Global System for Mobile Communications (GSM), and the first RAT is Long Term Evolution (LTE).

15. An apparatus configured for communication in a plurality of radio access technologies (RATs) in a wireless communication system, the apparatus comprising:
at least one transceiver configured for taking measurements of signals from a base station, wherein an access point provides communication coverage for a small cell and the base station provides communication coverage for a macro cell that overlaps with the small cell;
at least one processor configured for:
determining, based on the measurements, a level of communication coverage provided by the base station to the small cell using a first RAT; and
reducing a transmit power for at least a second RAT of the access point in response to a determination that the level of communication coverage provided by the base station to the small cell using the first RAT meets or exceeds a threshold level of communication coverage, wherein the second RAT is different than the first RAT and the second RAT provides a lower download speed than the first RAT; and
a memory coupled to the at least one processor for storing data.

16. The apparatus of claim 15, wherein the at least one processor is further configured for:
selecting a first mode of operation for the first RAT in response to determining that the level of communication coverage provided by the base station to the small cell is below the threshold level of communication coverage; and
selecting a second mode of operation for the first RAT in response to determining that the level of communication coverage provided by the base station to the small cell meets or exceeds the threshold level of communication coverage.

17. The apparatus of claim 16, wherein the at least one processor is further configured for:
determining whether the level of communication coverage provided by the base station to the small cell meets or exceeds a second threshold level of communication coverage;
reselecting a first mode of operation for the first RAT in response to determining that the level of communication coverage provided by the base station to the small cell is below the second threshold level of communication coverage; and
reselecting a second mode of operation for the first RAT in response to determining that the level of communication coverage provided by the base station to the small cell meets or exceeds the second threshold level of communication coverage.

18. The apparatus of claim 15, wherein:
the at least one transceiver is further configured for:
receiving additional measurements from at least one UE; and the at least one processor is further configured for:
recalibrating the transmit power of the second RAT based on the additional measurements.

19. The apparatus of claim 15, wherein taking measurements comprises at least one of performing network listen (NL), receiving a UE report, receiving the measurements over X2, or receiving the measurements from Operations, Administration, and Management (OAM).

20. The apparatus of claim 15, wherein the at least one processor is further configured for:
determining the transmit power for the second RAT based on the level of communication coverage provided by the base station to the small cell using the first RAT.

21. The apparatus of claim 15, wherein the second RAT is one of 1x, Universal Mobile Telecommunications System (UMTS), or Global System for Mobile Communications (GSM), and the first RAT is Long Term Evolution (LTE).

22. A non-transitory computer-readable medium storing executable instructions which cause a data processing device to:
take measurements of signals from a base station, wherein an access point provides communication coverage for a small cell and the base station provides communication coverage for a macro cell that overlaps with the small cell;
determine, based on the measurements, a level of communication coverage provided by the base station to the small cell using a first RAT; and
in response to a determination that the level of communication coverage provided by the base station to the small cell using a first RAT meets or exceeds a threshold level of communication coverage, reduce a transmit power for at least a second RAT of the access point, wherein the second RAT is different than the first RAT and the second RAT provides a lower download speed than the first RAT.

23. The non-transitory computer-readable medium of claim 22, wherein the computer-readable medium further causes the data processing device to:
select a first mode of operation for the first RAT in response to determining that the level of communication coverage provided by the base station to the small cell is below the threshold level of communication coverage; and
select a second mode of operation for the first RAT in response to determining that the level of communication coverage provided by the base station to the small cell meets or exceeds the threshold level of communication coverage.

24. The non-transitory computer-readable medium of claim 23, wherein the computer-readable medium further causes the data processing device to:
determining whether the level of communication coverage provided by the base station to the small cell meets or exceeds a second threshold level of communication coverage;
reselect a first mode of operation for the first RAT in response to determining that the level of communication coverage provided by the base station to the small cell is below the second threshold level of communication coverage; and
reselect a second mode of operation for the first RAT in response to determining that the level of communication coverage provided by the base station to the small cell meets or exceeds the second threshold level of communication coverage.

25. The non-transitory computer-readable medium of claim 22, wherein the computer-readable medium further causes the data processing device to:
   receive additional measurements from at least one UE; and
   recalibrate the transmit power of the second RAT based on the additional measurements.

26. The non-transitory computer-readable medium of claim 22, wherein taking measurements comprises at least one of performing network listen (NL), receiving a UE report, receiving the measurements over X2, or receiving the measurements from Operations, Administration, and Management (OAM).

27. The non-transitory computer-readable medium of claim 22, wherein the computer-readable medium further causes the data processing device to determine the transmit power for the second RAT based on the level of communication coverage provided by the base station to the small cell using the first RAT.

28. The non-transitory computer-readable medium of claim 22, wherein the second RAT is one of 1×, Universal Mobile Telecommunications System (UMTS), or Global System for Mobile Communications (GSM), and the first RAT is Long Term Evolution (LTE).

* * * * *